G. C. VENNUM.
VACUUM RECORDER.
APPLICATION FILED NOV. 25, 1911.
1,041,382.
Patented Oct. 15, 1912.
2 SHEETS—SHEET 1.
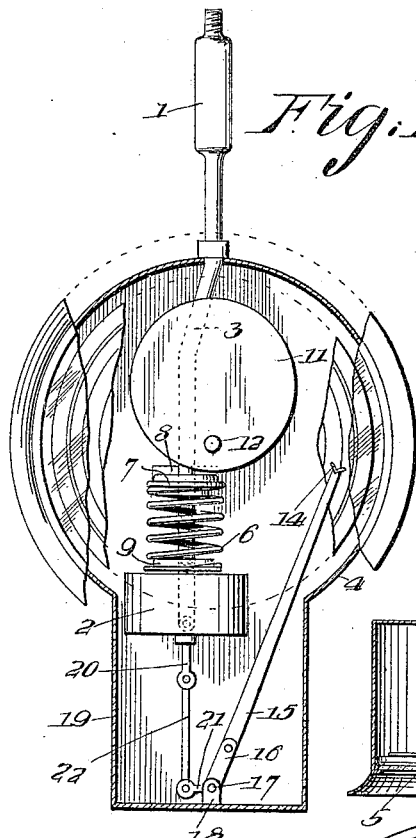
Fig. 1.
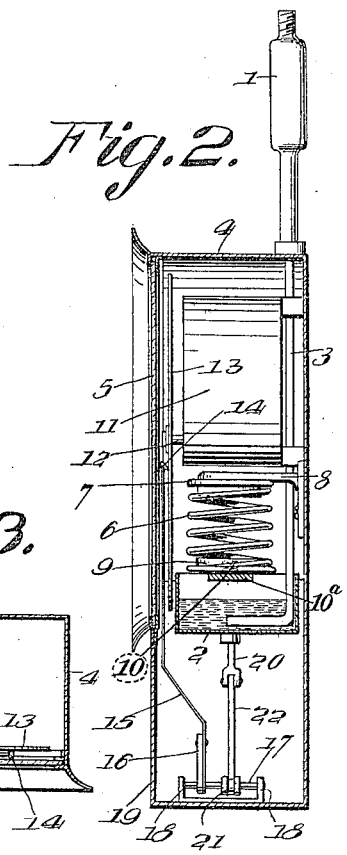
Fig. 2.
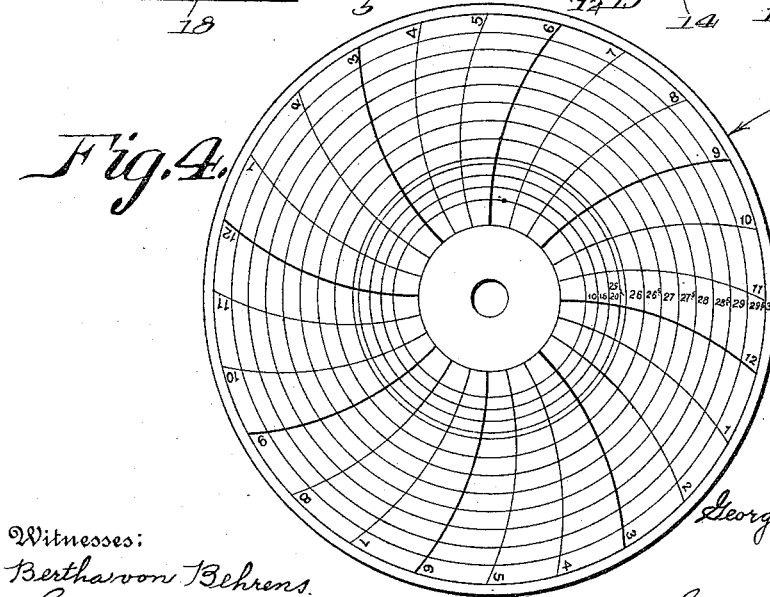
Fig. 3.
Fig. 4.
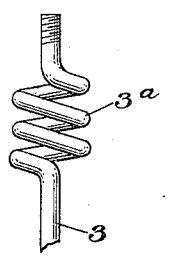
Fig. 5.
Witnesses:
Bertha von Behrens.
Lottie M. Fox.
Inventor:
George C. Vennum,
By Hugh K. Wagner,
His Attorney

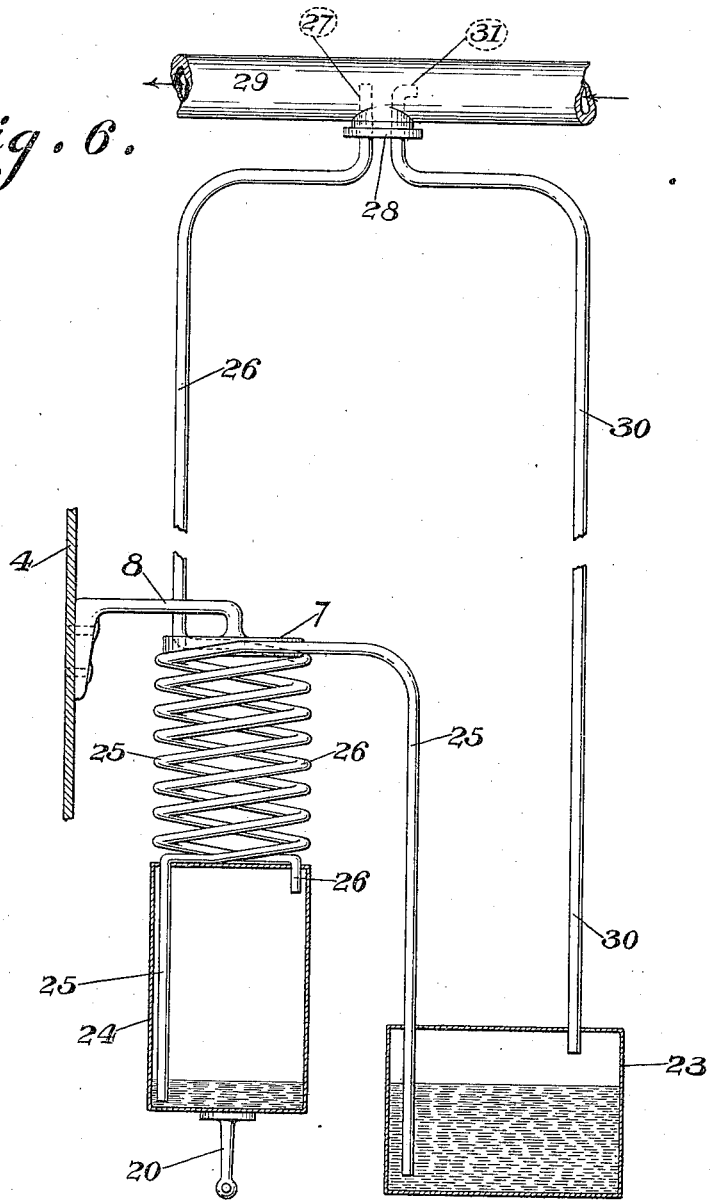

UNITED STATES PATENT OFFICE.

GEORGE C. VENNUM, OF ST. LOUIS, MISSOURI.

VACUUM-RECORDER.

1,041,382.

Specification of Letters Patent.

Patented Oct. 15, 1912.

Application filed November 25, 1911. Serial No. 662,281.

*To all whom it may concern:*

Be it known that I, GEORGE C. VENNUM, a citizen of the United States, residing at the city of St. Louis, State of Missouri, have invented certain new and useful Improvements in Vacuum-Recorders, of which the following is a specification, reference being had therein to the accompanying drawings.

This invention relates to gages for indicating and recording either vacua or pressures, and it comprehends primarily an improved instrument of the type specified which is extremely accurate in its operation and which, in addition to its ordinary use as above stated, may be utilized as a barometer and, also, as a controlling valve.

It further contemplates the production of a gage wherein provision is made for obtaining magnified readings on the recording chart between certain points within the range of the instrument.

A structural embodiment of the invention is illustrated in the accompanying drawings, whereof:

Figure 1 is a front elevation of the improved gage, portions of the case and chart being broken away to show the position of the main working parts; Fig. 2 is a vertical sectional view of said gage; Fig. 3 is a horizontal sectional view thereof; Fig. 4 is a front elevation of the chart; Fig. 5 is an elevation of an alternate form of fixed receptacle; and Fig. 6 is a diagrammatical sectional view showing the arrangement of the receptacles when the gage is used to measure pressures.

The gage is designed for operation by the transference of a suitable fluid, preferably mercury, from one of two receptacles to the other, one of which receptacles is fixed, while the other is movable and is connected with the stylus lever so as to operate the latter consequent upon and in accordance with its movement; the stylus, during its movements, traces a line upon a revolving chart which is operated by a clock of any desired type.

Referring to said drawings, 1 and 2 designate respectively the fixed and movable receptacles, and 3 the pipe connecting the same. The movable receptacle 2 is disposed within a case 4 which has the usual glass front 5 and is provided with an open top through which pipe 3 extends. The fixed receptacle 1 is located above and exteriorly of said case, as shown in Figs. 1 and 2, and, if desired, may constitute a part of pipe 3, as in the form of a coil 3ª, as depicted in Fig. 5. Said receptacle 2 is suspended from and supported by a counter balance device, here shown as a retractile coil spring 6 that is connected at its upper end to a cap 7, or equivalent element, carried by a horizontal bracket 8 secured to the rear wall of the case, and at its lower end, to a similar cap 9 removably mounted upon a vertical pin 10 attached to the center of the cross piece 10ª of the receptacle in question, as depicted in Figs. 1 and 2. In front of pipe 3 is disposed the clock 11, this element being likewise affixed to the rear wall of the case and being equipped with the usual shaft or arbor 12 which carries the revolving chart 13, the latter being removably attached thereto in any desired manner. The required markings upon the chart are made by means of a stylus 14 carried by an oscillating lever 15 that is fastened at its lower end to a lateral arm 16 secured to a short horizontal rock shaft 17 journaled in bearings 18 arranged within the depending extension 19 of the case. Said shaft is operatively connected with the movable receptacle, so as to rock consequent upon the movements of the receptacle, and to an extent directly proportionate to such movements, the connections between said parts consisting, in the construction illustrated, of a depending link 20 secured to the bottom of the receptacle, a second lateral arm 21 secured to the shaft at an angle to arm 15, and a vertical link 22 pivoted at its upper end to link 20 and at its lower end to arm 21.

Chart 13, which is carried by the clock shaft or arbor 12, as above stated, is ruled in the usual manner for time readings, and is also ruled to indicate the working vacuum, or pressure, according as the gage is used for one purpose or the other. In the case of a vacuum, the most important readings range approximately from twenty-five to thirty inches of mercury, and since in ordinary charts very accurate readings are impossible on account of the close spacing of the lines, the present gage is so constructed that its stylus lever and, hence, its stylus will traverse a greater distance between the ranges indicated, the lines between said ranges being spaced farther apart from each other, as depicted in Fig. 4. To effect the variable movement of the stylus lever requisite for this purpose, either or both of the two receptacles may be formed with an irregular or variable cross-sectional area, for example, as the fixed receptacle 1, which is formed with a variable cross-section, as illustrated in Fig. 1, i. e., the lower part of same being relatively smaller in cross-section than the upper part thereof, so that, for each unit of rise of the mercury in the lower part of said receptacle the stylus lever 15 makes a relatively smaller movement than it makes for each unit of rise of the mercury in the upper part of said receptacle.

In operating the device for measuring and recording vacua, the fixed receptacle 1 is connected in any suitable manner with the source of the working vacuum to be measured and recorded, and the mercury or other fluid is placed in the movable receptacle, the supporting spring 6 for the said movable receptacle having a stress which is sufficient to counter balance that receptacle when the mercury contained therein is at its normal level. The suction impulse of the vacuum will be exerted upon the mercury in the movable receptacle and will tend to draw the mercury through pipe 3 into the fixed receptable, whereupon spring 6 will be free to pull said movable receptacle upwardly a distance proportional to the quantity of mercury which has been displaced, this movement being transmitted through the parts 20, 22, 21, and 17 to the stylus lever, which latter, in turn, is rocked through a proportionally great arc and records its movement upon the chart. Where either receptacle has a variable cross-sectional area, the movement of the stylus lever will, also, vary, as will be apparent.

When the gage is to be utilized to measure differences in high pressures, as, for example, the velocity head in the flow of liquids or gases from boilers, pumps, etc., through pipes, etc., the receptacles are arranged as illustrated in Fig. 6, the fixed receptacle 23 being approximately on a level with the movable receptacle 24, which is supported by the coiled spring pipes 25 and 26, both of said pipes being secured to the cap 7 carried by bracket 8 secured to the rear wall of casing 4, and both of said receptacles being closed. The pipe 25 is arranged to extend deep into the movable receptacle 24 and, also, deep into the fixed receptacle 23, the ends of same being below the level of the mercury, so as to form a siphon to allow the mercury to flow from one receptacle into the other. The pipe 26 leads from the low pressure side 27 of a "Pitot" pipe connection 28, or similar device that is attached in the usual manner to the pipe 29, or other source of fluid supply, and projects into the top of the movable receptacle 24.

A pipe 30 leads from the high pressure side 31 of the connection 28, and extends into the top of the fixed receptacle 23. The pressure medium, which may be steam, water, air, gas, etc., passes through the pipe 29 in the direction of the arrows, Fig. 6, and passes through the pipes 26 and 30 into the movable and fixed receptacles 24 and 23, respectively, thereby exerting its pressure upon the mercury in both receptacles, the high pressure, i. e., the velocity pressure of the medium being exerted upon the mercury in the fixed receptacle 23, and the low pressure, i. e., the normal pressure of the medium being exerted upon the mercury in the movable receptacle. As long as the medium remains at rest in pipe 29, the pressure of same in the fixed receptacle is equal to the pressure of the medium in the movable receptacle, and the mercury in the fixed receptacle 23 remains at the same level with the mercury in the movable receptacle. When the medium under pressure passes through the pipe 29, a greater pressure is exerted upon the mercury in the fixed receptacle 23 than in the movable receptacle 24, with the result that a quantity of mercury is forced from the fixed receptacle into the movable receptacle, thereby causing the latter to descend a distance proportional to the quantity of mercury forced into same, this movement of the movable receptacle being transmitted to the stylus lever, as hereinabove described. As the difference of the pressures in the fixed and movable receptacles increases, the movable receptacle descends farther, but when the difference of the pressures in the fixed and movable receptacles decreases, the mercury siphons back through pipe 25 into the fixed receptacle 23.

What is claimed is:—

1. In a gage of the character specified, the combination of a case having a glass front and an opening in its top, a movable receptacle disposed within said case, a counterbalance device disposed within said case whereon said receptacle is mounted, a fixed receptacle located exteriorly of said case at a higher elevation than the movable receptacle, a pipe connecting said receptacles and extending through said opening, said movable receptacle being adapted initially to contain a fluid transferable therefrom through said pipe to said fixed receptacle by the action of the force to be measured, and an indicating and recording device located within said case behind said glass front and controlled by said movable receptacle.

2. In a gage of the character specified, the combination of a case provided with a glass front and with a depending extension, the top of the case having an opening therein, a movable receptacle disposed within said case, a counterbalance device disposed within said case whereon said receptacle is mounted, a fixed receptacle located exteriorly of said case, a pipe connecting said receptacles and extending through said opening, and an indicating and recording device located behind said glass front and controlled by said movable receptacle.

In testimony whereof I hereunto affix my signature in the presence of two witnesses.

GEORGE C. VENNUM.

Witnesses:
  LOTTIE M. FOX,
  BERTHA VON BEHRENS.

Copies of this patent may be obtained for five cents each, by addressing the "Commissioner of Patents, Washington, D. C."